United States Patent
Chavan et al.

(10) Patent No.: US 10,886,741 B1
(45) Date of Patent: Jan. 5, 2021

(54) POWER LINE OSCILLATION DAMPING USING DISTRIBUTED FACTS DEVICES THAT ARE VOLTAGE/IMPEDANCE INJECTION MODULES ATTACHED TO THE HV POWER LINES

(71) Applicant: Smart Wires Inc., Union City, CA (US)

(72) Inventors: Govind Chavan, Union City, CA (US); Haroon Inam, San Jose, CA (US)

(73) Assignee: Smart Wires Inc., Union City, CA (US)

( * ) Notice: Subject to any disclaimer, the term of this patent is extended or adjusted under 35 U.S.C. 154(b) by 350 days.

(21) Appl. No.: 15/849,178

(22) Filed: Dec. 20, 2017

Related U.S. Application Data (60) Provisional application No. 62/594,899, filed on Dec. 5, 2017.

(51) Int. Cl.
  *H02J 13/00* (2006.01)
  *H02J 3/24* (2006.01)

(52) U.S. Cl.
  CPC .......... *H02J 3/24* (2013.01); *H02J 13/0006* (2013.01)

(58) Field of Classification Search
  None
  See application file for complete search history.

(56) References Cited

U.S. PATENT DOCUMENTS

| | | |
|---|---|---|
| 2008/0177425 A1 | 7/2008 | Korba et al. |
| 2010/0023179 A1 | 1/2010 | Korba et al. |
| 2012/0113695 A1* | 5/2012 | Chivite Zabalza ..... H02M 7/49 363/71 |
| 2014/0032000 A1* | 1/2014 | Chandrashekhara ... H02J 3/382 700/292 |
| 2016/0141991 A1 | 5/2016 | Khalili Nia et al. |
| 2017/0025978 A1 | 1/2017 | Wu et al. |

OTHER PUBLICATIONS

Angquist, L. et al., "Power Oscillation Damping Using Controlled Reactive Power Compensation—A Comparison Between Series and Shunt Approaches", IEEE Transactions on Power Systems, vol. 8, No. 2, May 1993, pp. 687-700.

Banaei, M. R. et al., "Damping of power system oscillations using imperialist competition algorithm in power system equipped by HVDC", Ain Shams Engineering Journal, vol. 6, Issue 1, pp. 75-84, Mar. 2015, 30 pp. total.

(Continued)

*Primary Examiner* — Paul B Yanchus, III
(74) *Attorney, Agent, or Firm* — Womble Bond Dickinson (US) LLP (57) ABSTRACT

Methods for damping oscillations in a high voltage power grid, including power distribution and supply systems by distributing a plurality of voltage/impedance injection modules to inject voltages/impedances onto high voltage power transmission lines of the power grid, sensing power oscillations on the high voltage transmission lines, extracting the dominant oscillatory mode or modes of sensed power oscillations on the high voltage transmission lines, and injecting voltages/impedances responsive to at least the most dominant oscillatory mode onto the respective high voltage transmission lines to counteract the respective oscillations.

15 Claims, 8 Drawing Sheets

(56) References Cited

OTHER PUBLICATIONS

Beza, Mebtu et al., "An Adaptive Power Ocsillation Damping Controller by STATCOM With Energy Storage", IEEE Transactions on Power Systems, vol. 30, No. 1, Jan. 2015, pp. 484-493.

Mhaskar, U. P. et al., "Power Oscillation Damping Using FACTS Devices: Modal Controllability, Observability in Local Signals, and Location of Transfer Function Zeros", IEEE Transactions on Power Systems, vol. 21, No. 1, Feb. 2006, pp. 285-294.

Mithulananthan, N. et al., "Comparison of PSS, SVC, and STATCOM controllers for damping power system oscillations", IEEE Transactions on Power Systems, vol. 18, No. 2, May 2003, pp. 786-792.

Rigby, Bruce S. et al., "Analysis of a Power Oscillation Damping Scheme Using a Voltage-Source Inverter", IEEE Transactions on Industry Applications, vol. 38, No. 4, Jul./Aug. 2002, pp. 1105-1113.

Samal, Sudhansu K. et al., "Damping of power system oscillations by using unified Power Flow Controller with POD and PID controllers", 2014 International Conference on Circuit, Power and Computing Technologies (ICCPCT), Mar. 20-21, 2014, pp. 662-667.

Schauder, C. D. et al., "Operation of the Unified Power Flow Controller (UPFC) Under Practical Constraints", IEEE Transactions on Power Delivery, vol. 13, No. 2, Apr. 1998, pp. 630-639.

Zeni, Lorenzo et al., "Power Oscillation Damping From VSC-HVDC Connected Offshore Wind Power Plants", IEEE Transactions on Power Delivery, vol. 31, No. 2, Apr. 2016, pp. 829-838.

\* cited by examiner

Exemplary Power Oscillation signal analysis

Figure 4

Dominant modes extracted from the signal in Fig.4

| Frequency (Hz) | Damping coefficient ($s^{-1}$) | Residue (MW) | Phase (rad) |
|---|---|---|---|
| 0 | 3.0980 | 0.4987 | -3.1416 |
| 0 | 0.00023 | 167.8370 | 0 |
| 1.7515 | 1.1300 | 0.4746 | 2.8063 |
| 1.9079 | 0.8671 | 0.3407 | -1.3983 |
| 1.1247 | 0.7647 | 0.1091 | 1.3615 |
| 0.9424 | 0.2944 | 4.2228 | 1.1053 |

MODAL CONTENT OF THE DAMPED POWER FLOW

| Frequency (Hz) | Damping coefficient ($s^{-1}$) | Residue (MW) | Phase (rad) |
|---|---|---|---|
| 0 | 0.4593 | 10.9876 | -3.1416 |
| 0 | 0.0000578 | 174.6294 | 0 |
| 2.5648 | 19.6762 | 1.1713 | -1.9239 |
| 0.8769 | 0.2691 | 0.3413 | 3.0468 |
| 7.9718 | 5.5908 | 0.1847 | 0.5467 |

| Sensors associated with a power oscillation damping (POD) system, coupled to the power system, sense the power oscillations on the power system that are initiated by transient events |
|---|

S1201

| The sensed information regarding the power oscillations is sent over a communication channel to a communication module of the POD system |
|---|

S1202

| A mode identification module of the POD system identifies the dominant oscillatory mode of the power oscillation using a processing capability within the POD system |
|---|

S1203

| The low frequency power components of the power oscillations are extracted from the identified dominant oscillatory mode using a notch filter |
|---|

S1204

| A response equation generation module in the POD system uses the extracted power components of the dominant oscillatory modes to generate a set of damping equations |
|---|

S1205

| A command and decision module of the POD system generates commands and instructions to be sent to a plurality of voltage/impedance injection modules distributed over the power system based on the set of damping equations and a set of pre-established rules saved within the POD system |
|---|

S1206

| The communication module of the POD system sends the appropriate commands and instructions to the distributed voltage/impedance injection modules over a communication channel |
|---|

S1207

| Each of the distributed voltage/Impedance injection modules generates and injects a voltage/impedance on to the respective power line based on the commands and instructions received, from the communication module, to damp the power oscillations on the power system |
|---|

POWER LINE OSCILLATION DAMPING USING DISTRIBUTED FACTS DEVICES THAT ARE VOLTAGE/IMPEDANCE INJECTION MODULES ATTACHED TO THE HV POWER LINES

CROSS-REFERENCE TO RELATED APPLICATIONS

This application claims the benefit of U.S. Provisional Patent Application No. 62/594,899 filed Dec. 5, 2017, the entirety of which is incorporated herein by reference.

BACKGROUND OF THE INVENTION

1. Field of the Invention

The present invention relates to the field of high voltage power generation and distribution systems control.

2. Prior Art

Power systems in the past comprised of large power generator facilities at well-defined locations, High Voltage (HV) Power grids linking these generating stations to power distribution points, some power storage systems for storing any excess power and supplying the stored power in time of sudden demand thereby smoothing out the perturbations felt by the power generating stations, distribution and supply grids that step down the received high voltages to voltages suitable for use at the loads. The large power generators and power storage systems introduce large inertial components within the power systems.

The power systems further had inductive, capacitive and resistive impedances associated with the generation systems, the HV power grid, and the distribution and supply systems. When a sudden disturbance, such as an impulse or step change happens, the systems tend to go into power oscillations at a resonant frequency of the system, which is an oscillatory mode of the system. The typical electro-mechanical oscillations in the generator systems lie in the 0.1 to 3 Hz range depending on the power system's natural resonant frequency (based on its eigenvalues) and its harmonics.

The inertial component of the large generators and built in damping within the power system acts as a break on sudden changes and hence damp the power oscillations. When the damping is insufficient to reduce or limit the oscillations, it can result in sustained power oscillations that can stress and damage the equipment of the power system. If the damping is negative it can cause buildup of oscillations and cause cascading failure of the system.

In order to provide a higher rate of damping capable of limiting power oscillations at the resonant oscillating frequency of the power system, it is necessary to calculate the damping available at each of the component frequency of the oscillation and introduce additional damping at the frequency components that has low damping. This is currently an iterative process that is difficult and time taking. Disturbing a power system with a plurality of interconnected generators spatially separated by large distances will tend to swing coherently with each other makes the problem of designing a power oscillation control system very complex.

The current method of control itself is centralized and the power oscillation damping units using devices are installed at substations. The methods of damping by using centralized FACTS devices and HV direct current (DC) converters have been also proposed for this purpose in the past. These damping proposals include thyristor-controlled switched capacitors (TCSCs) and Static VAR compensators, Static Synchronous Compensators (STATCOM), Unified Power Flow Controllers (UPFC), SSSCs, and Voltage source converters-with High Voltage DC sources (VSC-HVDC) among others. These centralized expensive solutions using high power output devices have had limited success in power oscillation damping in power systems.

The introduction of green renewable energy generation systems into the power system, the potential for introduction of step and impulse disturbances with the accompanying power oscillations have also increased. The renewable energy devices without storage capability can be considered as inertia-less generators. When these replace the old synchronous generators, the effect is to reduce the overall inertial component of the system itself. This reduction has an adverse effect on such power system stability with systems that are more prone to power oscillations. This problem is further made worse by the fact that there is persistent "disturbance" of power due to the intermittency of power generation with renewable energy generation providing almost continuous excitation to the power system with no time for the power oscillations to be damped by the natural damping capability of the power system itself.

Hence there is an increased need for a better and efficient method for power oscillation damping with integration of increased renewable energy resources or generation.

BRIEF DESCRIPTION OF THE DRAWINGS

FIG. 12—is a typical flow diagram of the POD method as per an embodiment of the invention.

DETAILED DESCRIPTION OF THE PREFERRED EMBODIMENTS

All Power systems have inherent resonant frequencies that result from the system characteristics that include inductive, capacitive, resistive loads and the impedances and inertia introduced by the synchronous generator and storage systems that form part of the power system. Any transient events within the power system can initiate the system oscillations at these resonant frequencies. In legacy power systems, the oscillations were counteracted by the large inertia of the generating systems which took time to respond to these oscillations, resulting in these oscillations getting damped. The new power systems with the connected renewable energy generators, that have very low inertia component and a variable generator input based on the wind or solar availability introduce many more transient events that cause power system oscillations. What is disclosed is the use of a group of flexible alternating current transmission system (FACTS) devices that are distributed voltage/impedance injection modules, such as the distributed static series synchronous compensators, having fast response capability, with high speed communication, distributed over the power system, operating in a coordinated fashion within the group for power oscillation damping.

Figure 1:
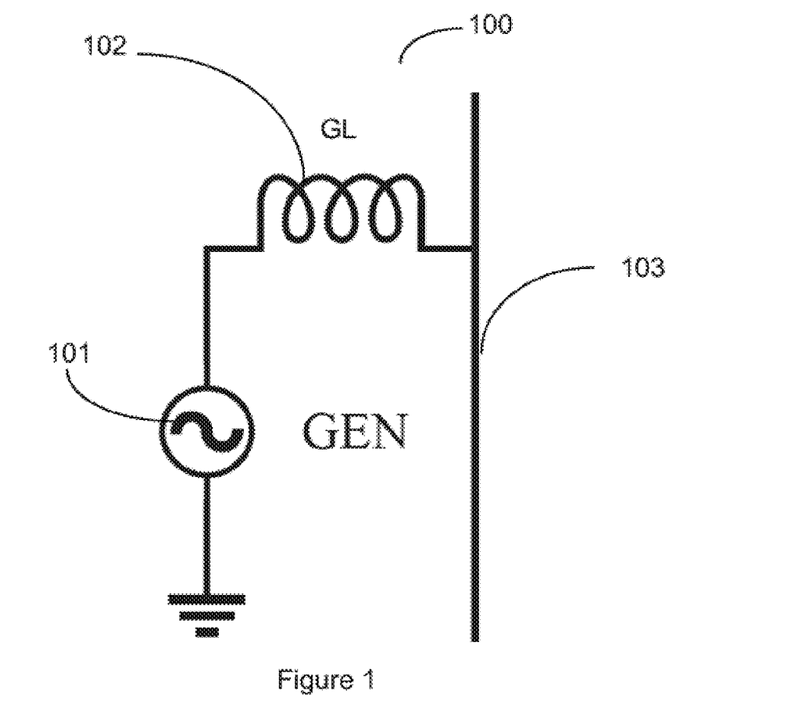
FIG. 1—shows a typical circuit connection 100 of a single phase of a synchronous three phase power generator GENx to the high voltage (HV) distribution grid. (Prior art)

FIG. 1 shows a typical circuit connection example 100 of a single phase of a synchronous three phase power generator GENx 101 to the high voltage (HV) distribution grid termination 103. The generator is connected to the high voltage power distribution grid termination 103 and the connection has an inductive value represented by L, 102. The typical three phase synchronous generator 101 is used to convert stored potential such as stored hydro-energy or chemical energy such as thermal energy into electrical energy. The power balance relationship for the synchronous generator is modeled as a second order damped oscillator described by the swing equation-1:

$$M\ddot{\delta} = P_m - \frac{EV}{X_s}\sin(\delta - \theta) - D\dot{\delta} \qquad \text{equation-1}$$

where, M, D and $P_m$ are the inertia, damping and mechanical power input for the synchronous generator. $E\angle\delta$ is the internal EMF of the Thevenin equivalent of the synchronous generator, $V\angle\theta$ is the terminal voltage of the synchronous generator, and $X_s$ is its equivalent Thevenin reactance. Eq. (1) is a non-linear differential equation, however, for small values of angle ($\delta-\theta$), the equation can be linearized as $$M\Delta\ddot{\delta} = \Delta P_m - \frac{EV}{X_s}\cos(\delta_0 - \theta)\Delta\delta - D\Delta\dot{\delta}$$

where $\delta_0$ is the steady state rotor angle value, and $\Delta\delta$ and $\Delta P_m$ represent the small signal perturbations in $\delta$ and $P_m$. Each generator within the network will have its own second-order differential equation, which is coupled with other second-order equations through Kirchoff's Voltage and Current laws.

Figure 2:
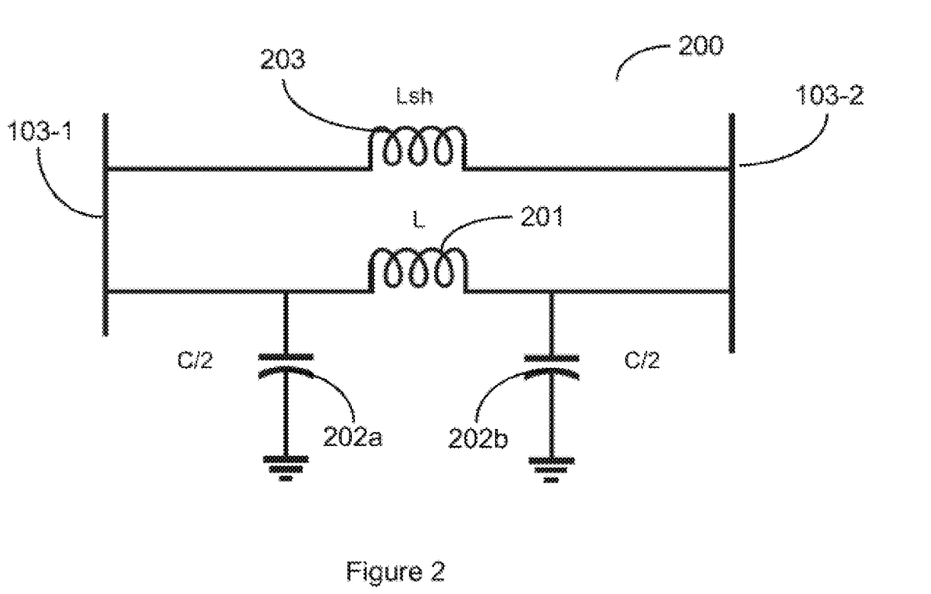
FIG. 2—shows a HV grid line equivalent 200. (Prior art)

A three phase HV grid line equivalent 200 is shown in FIG. 2. The HV grid is represented as a Pi network having an inductance L 201 and two equal value capacitances C 202a an 202b.

Figure 3:
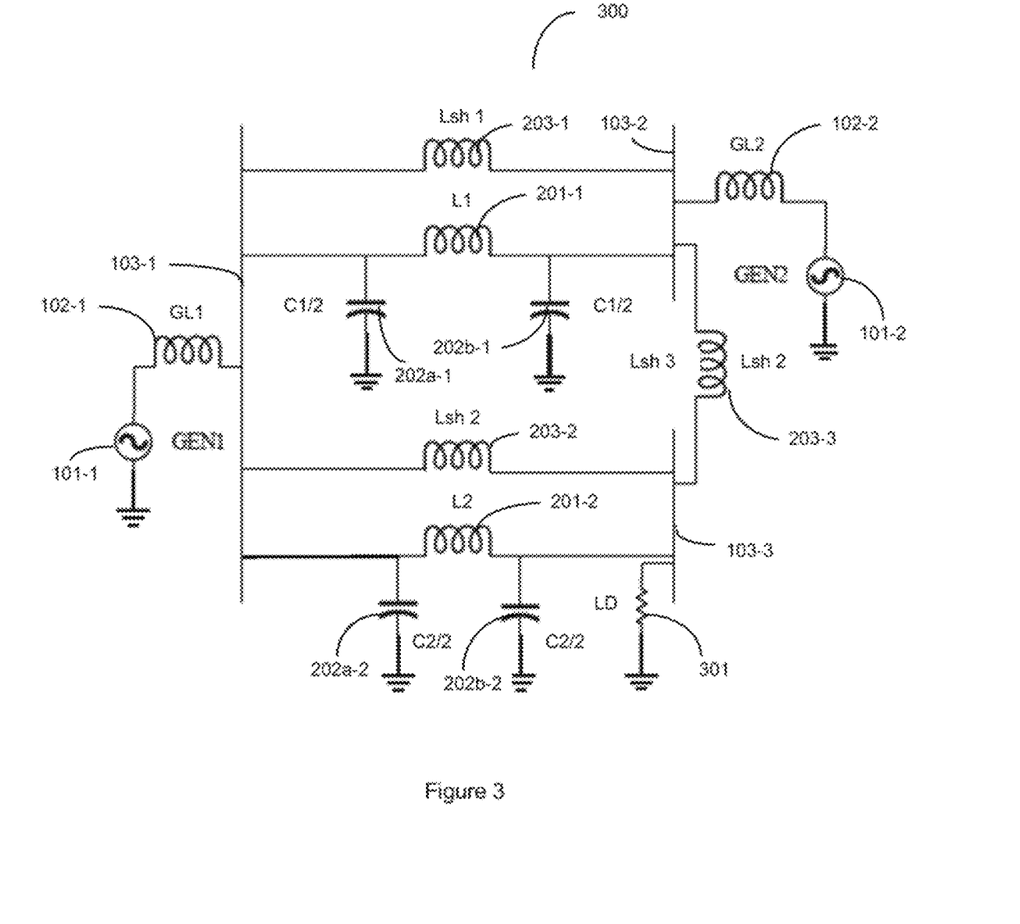
FIG. 3—shows an example of an equivalent circuit 300 of a High Voltage power system (Prior Art).

FIG. 3 shows an example of an equivalent circuit 300 of a High Voltage power system. Typically, multiple three phase HV distribution grids groups in parallel are used between HV grid terminations 103-1, 103-2 and 103-3 to transfer power from the generators locations 101 to loads 301 or distribution points. In FIG. 3 two sets of HV transmission grid lines are shown. One HV transmission grid represented by 202-1, 202a-1 and 202b-1 between terminations 103-1 having a generation capability provided by 101-1 at termination 103-1 and a second generation capability provided by generator 101-2 having a generation capability 103-2. The HV termination 101-1 is also connected to a second termination 103-3 using a second HV transmission line represented by the pi network 201-2, 202a-2 and 202b-2. These transmission lines handle the transfer of power. In this case the load is shown as a pure resistive load at the termination 103-3, but it can also be a combination of inductive, resistive and capacitive loads. The use of multiple redundant power transfer circuits from generators 101-1, 101-2 to load 301 will result in power sharing between the HV power systems. This power transfer and sharing are represented by the pure inductive coupling 203-1, 203-2 and 203-3 connecting the three terminations 103-1, 103-2 and 103-3.

Power oscillations are triggered within the network of transmission lines of the high voltage power system added to cover the due to events that disturb the state of the system such as loss of a transmission line or tripping of a safety relay or loss of power from a generator. These are events that happen very rarely in power systems and are contingencies. But due to addition of wind and solar generation capability being included in the overall system the intermittent nature of power availability and lack thereof due to weather conditions, the systems of today experience more and more disturbances that can act as triggers for power oscillations. The power from renewable sources are also not controllable by any central control as they vary from time to time. Hence these sources can be considered as negative loads on the power system that can excite power oscillations within the network of transmission lines of the power system during sudden changes in sourced power. Also, as discussed earlier any green energy source without the capability to store to smooth out power flow into the system acts as an inertia-less source with minimum damping. This also results in the reduction of overall system damping enhancing the power oscillations.

Figure 4:
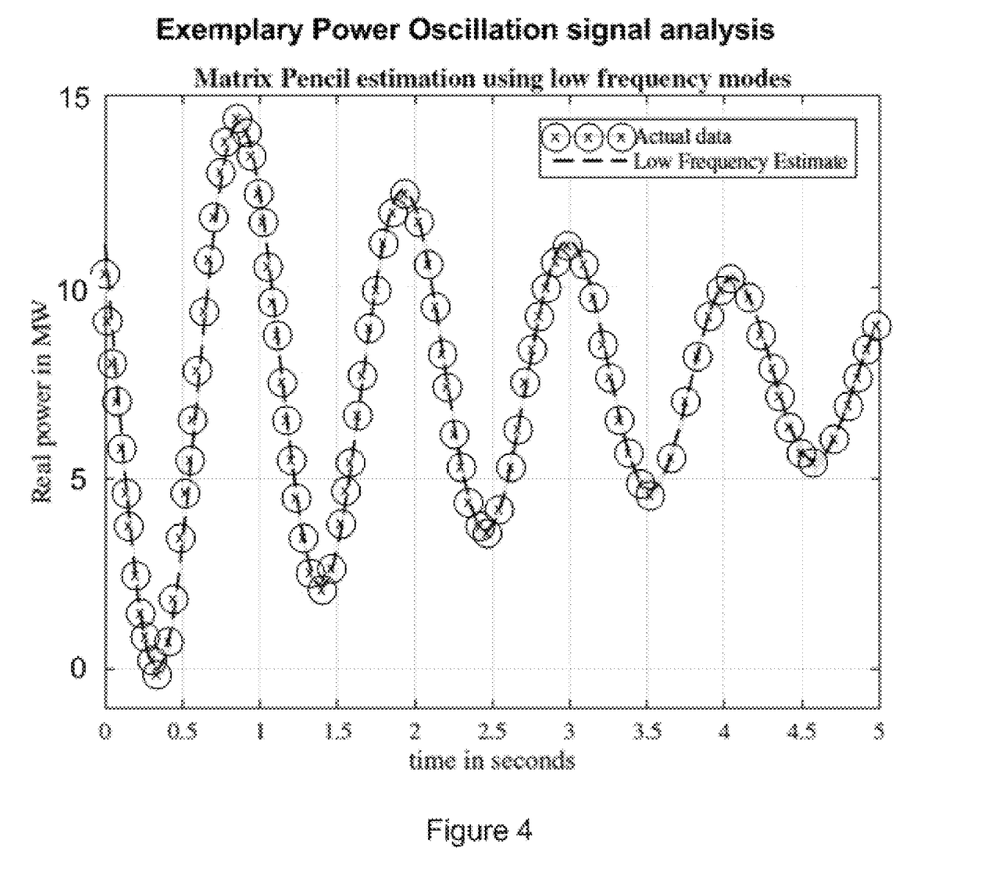
FIG. 4—is a power oscillation example 400 excited in a power system due to sudden input of a perturbation.
Figure 5:
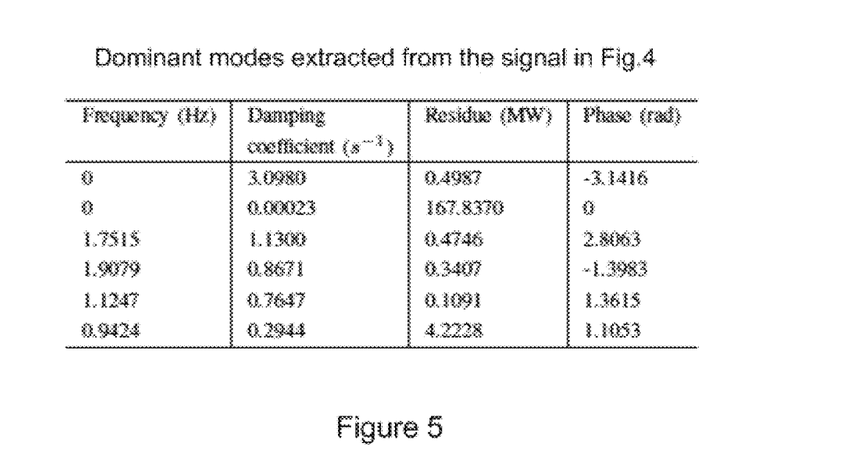
FIG. 5—extracted prominent modes including the exponential modes from power oscillations of FIG. 4 as per an embodiment of the invention.

FIG. 4 is an exemplary power oscillation 400 excited in a power system due to sudden input of a perturbation, such as the one due to a solar power generation unit coming on the grid. As can be seen the power oscillation has dominant low frequency oscillatory mode that is based on the power balance equation-1. The dominant power oscillatory mode in this exemplary power system is shown at a fundamental frequency $f_{oc}$ of 0.9424 Hz. In order to identify and damp the oscillations it is necessary to identify accurately the oscillation frequency. Since any measured signal can be the sum of complex exponential terms, the measured signal can be described by the equation-2 below:

$$y(t) = y_0(t) + \sum_{i=1}^{N} R_i e^{(\sigma_i + j\omega_i)t} + n(t) \qquad \text{equation-2}$$

where
$y_0(t)$: DC and exponential modes which lead to the DC bias in the signal
$n(t)$: signal noise
N: Number of oscillatory modes
$R_i$: Complex residue of the $i^{th}$ mode
$\sigma_i + j\omega_i$: Complex angular frequency of the $i^{th}$ mode In order for the damping control to be established it is necessary to estimate $R_i$, $\sigma_i$ and $\omega_i$ for all the oscillation modes. There are multiple methods for extracting the modal information in the low frequency oscillation that include the time domain methods, such as Pony's method, Matrix pencil method etc. FIG. 4 also shows the estimated alignment between the oscillating signal and the signal estimation for modal extraction using Matrix pencil method. Using any of these available methods the mode information is extracted and analyzed to identify the modes that are prominent with low damping in the oscillations in the power system and the estimate $R_i$, $\sigma_i$ and $\omega_I$ for each of the modes identified. The extracted dominant oscillatory mode and the additional exponential modes of the oscillation are shown in the table in FIG. 5. The dominant oscillatory mode and the exponential modes establish the power flow Pt within the power oscillation which as extracted from the exemplary oscillations is approximately 7.5 MW and is shown in FIG. 4 and the table in FIG. 5. The normal power flow over the line is 167.837 MW. The total power transferred power over the line under oscillations comprise the normal power flow component and the oscillatory power component including the power within the exponential components of the oscillating frequency on the power line. It can be seen in FIG. 5 that the dominant oscillatory mode is at a frequency of 0.9424 with a low damping coefficient of 0.2944.

In order to damp the oscillations, it is necessary to design a controller capable of power oscillation damping and define the elements on the power system that can act based on input from the controller to counteract the oscillations. In the past substation-based SSSCs and high voltage DC (HVDC) converters have been proposed to provide the inputs necessary to damp the power oscillations. In the present application what is proposed is to use the distributed impedance/voltage injection modules that are FACTS devices used as distributed power flow control devices, typically meant for injecting impedance on the HV transmission lines to balance the power flow, to counteract the power oscillations. They have the advantage that these are lightweight, lower power, faster acting and inexpensive and can be easily distributed on the line or at tower locations across the power system. In this case a group of distributed power control devices pre-assigned for POD application act together to generate and inject the voltage/impedance necessary for achieving POD. The use of distributed FACTS devices for this purpose also provides the flexibility to use devices of different ratings and capabilities in the group and still achieve the desired result of POD as individual devices of the group are enabled to generate and inject different voltages/impedances to provide a cumulative result that is used for effective power oscillation damping.

The dominant oscillatory mode for the damping controller can be extracted from a plurality of oscillation parameters. In one embodiment, what is disclosed as an exemplary method is the use of the power Pt on the transmission line. This requires the initial perturbation and the dominant oscillatory mode to be suppressed. By designing and using a notch filter centered at the dominant oscillation frequency $f_{oc}$ determined previously, as part of the damping controller, to extract the oscillatory modes, it is hence possible to isolate the components of the oscillations, which are Pr the real power component and Qi the quadrature component on the lines. A typical notch filter transfer characteristics is shown in equation-3

$$F(s) = \frac{2\zeta\omega_{osc}s}{s^2 + 2\zeta\omega_{osc}s + \omega_{osc}^2} \quad \text{equation-3}$$

The transfer characteristics of an exemplary notch filter designed with least settling time for a 2% band margin is for the exemplary power oscillations is shown in equation-4 below.

$$F(s) = \frac{9.474s}{s^2 + 9.474s + 35.06} \quad \text{equation-4}$$

The output of the damping controller is then fed to a series of distributed impedance injection modules specifically intended for power oscillation suppression on the power system to counter act the power oscillations. The impedance/voltage injection modules may be of a pulse injection type, a step function injection type, a sinusoidal waveform injection type or any other suitable injection mode. By combining the pulses or adding the step outputs of the series of impedance/voltage injection modules in an appropriate fashion it is possible to generate a pseudo-sinusoidal wave form having a plurality of incremental steps, which is then smoothed by the inductance of the power system to a sine wave of the line frequency. The impedance/voltage injection modules may be enabled to inject the impedance/voltage equally, proportionally, based on their ratings (capabilities), location, or any other criteria decided by the damping controller. In that regard, impedance/voltage injection modules of different ratings may be used in any one power distribution system based on availability and/or damping requirements or other considerations.

Figure 6:
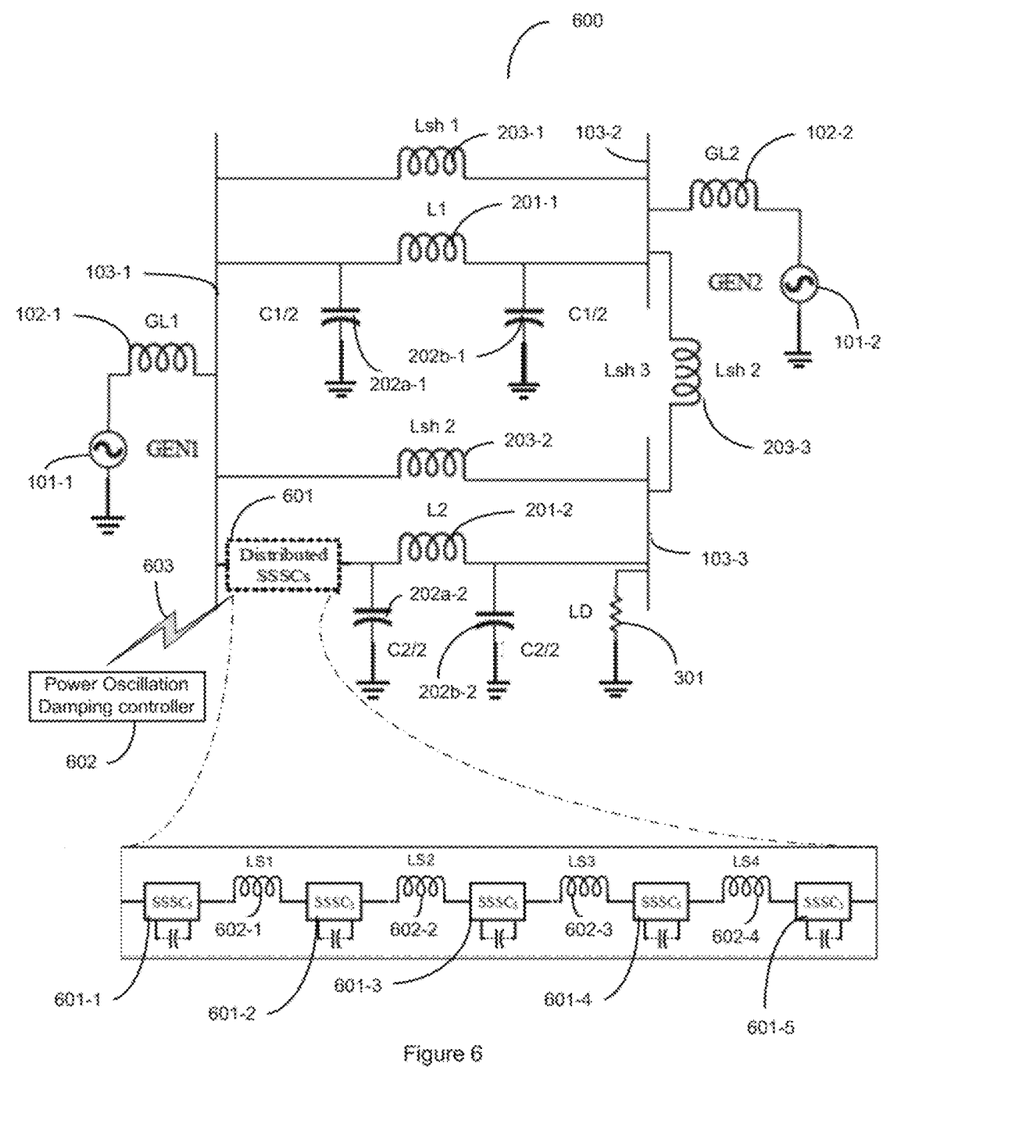
FIG. 6—example 600 of the implementation of an embodiment of the invention for power oscillation damping over on the HV power system of FIG. 3.
Figure 7:
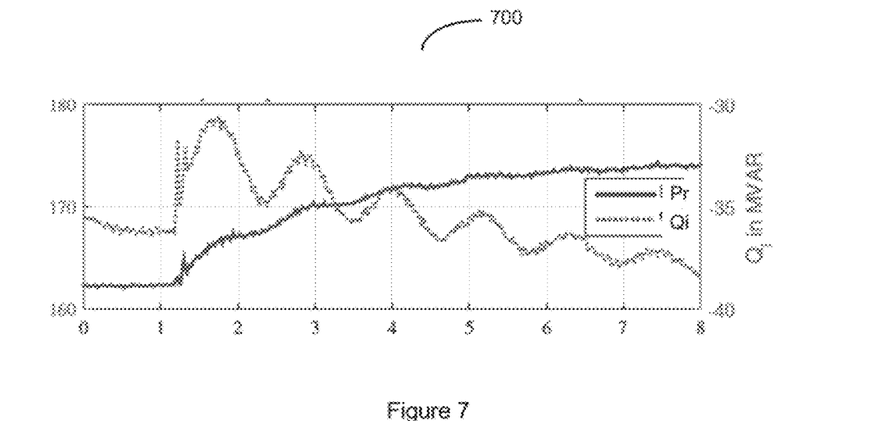
FIG. 7—real power Pr and imaginary power Qi of the power oscillations in the exemplary power system provided to a notch filter to extract the oscillatory modes for the damping equation per an embodiment of the invention.
Figure 8:
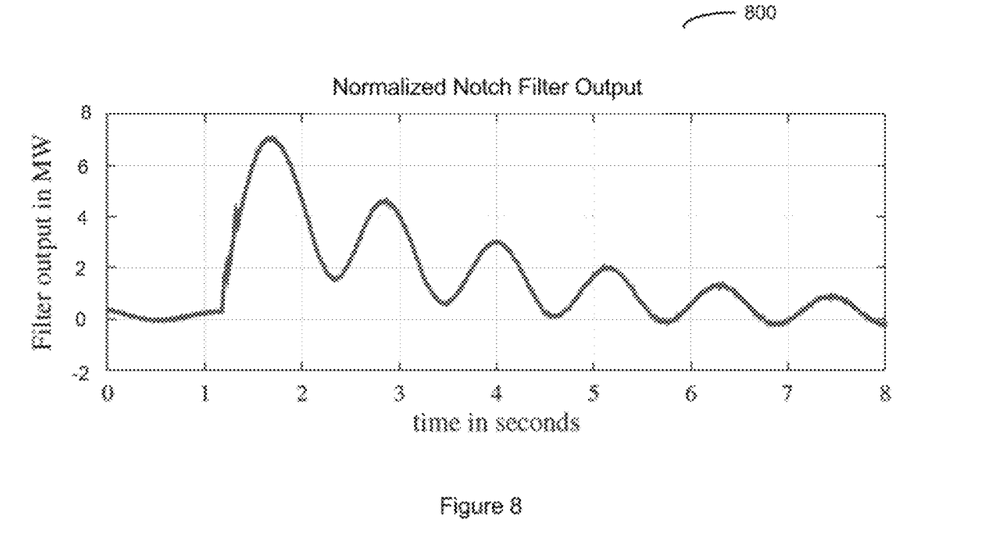
FIG. 8—shows an exemplary output of the notch filter used to generate the damping equations as per an embodiment of the current invention.
Figure 9:
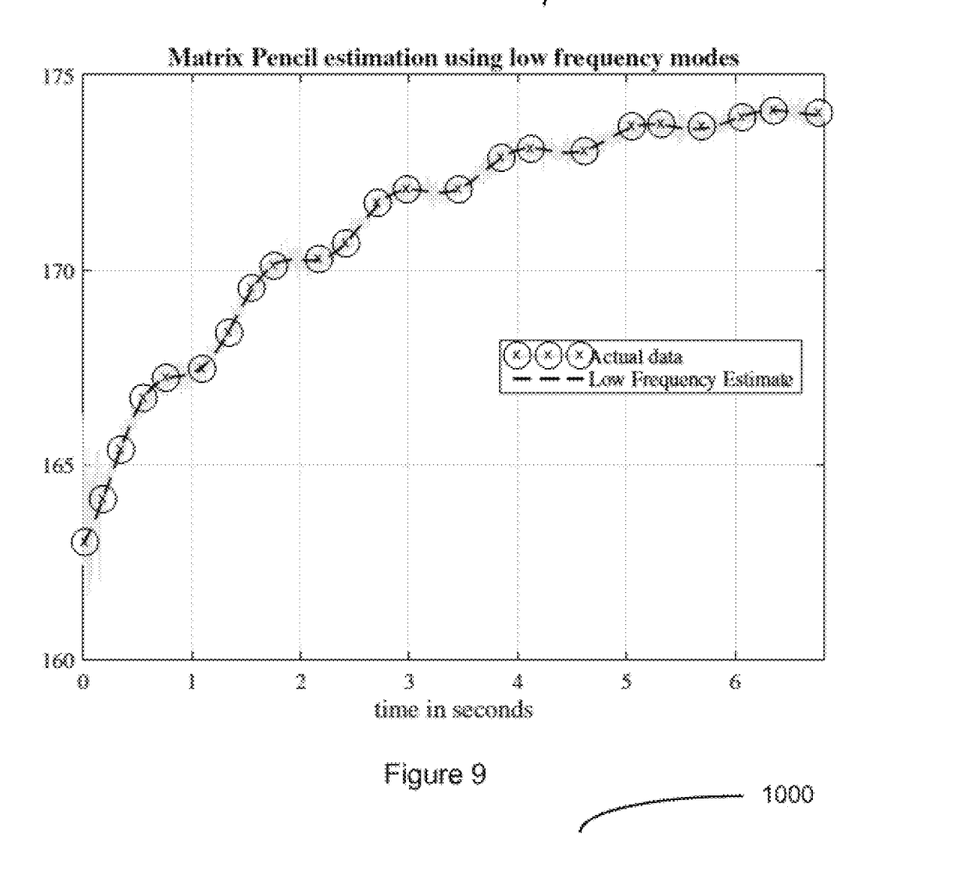
FIG. 9—shows an example 900 of the damped low frequency oscillations in the power system by applying an embodiment of the POD method disclosed.

In the example of the implementation of the invention shown in FIG. 6, five impedance/voltage injectors 601 (-1 to -5), capable of pulse width modulated (PWM) pulse generation and injection is serially arranged on the power transmission line spaced at a predetermined inductance LS 602 9-1 to -4), typically of 10 mH inductance. The impedance injectors 601 are in communication with the power oscillation damping (POD) controller 602 typically by wireless link 603. The real power Pr and imaginary power Qi of the exemplary power system, whose oscillation characteristics 400 shown in FIG. 4 are provided in FIG. 7. This input is provided to the notch filter within the POD controller and is shown in FIG. 7. The normalized output of the notch filter 800 that is generated from the exemplary oscillation in FIG. 4 is shown in FIG. 8. This notch filter output is what is used as control input to the impedance/voltage injection modules 601 via the wireless communication link 603. All the injection modules are controlled by the same control input from the damping controller, based on the output of the notch filter, but are programmed to inject phase shifted by 36 degrees to cover half the oscillation cycle. When a sudden change to the stability of the system, such as turn on of a solar generator to supply power into the power system happens, the power system tends to go into oscillation as described previously. By injecting appropriate energy/voltage in pulse from each of the impedance/voltage injectors on to the HV power transmission lines, opposing the component of the power oscillations on the power system, the power oscillations can be effectively damped in the system. Models of such an exemplary input with the superimposed damped oscillations as a result of the implementation of the teaching of the invention is shown in FIG. 9.

Figure 10:
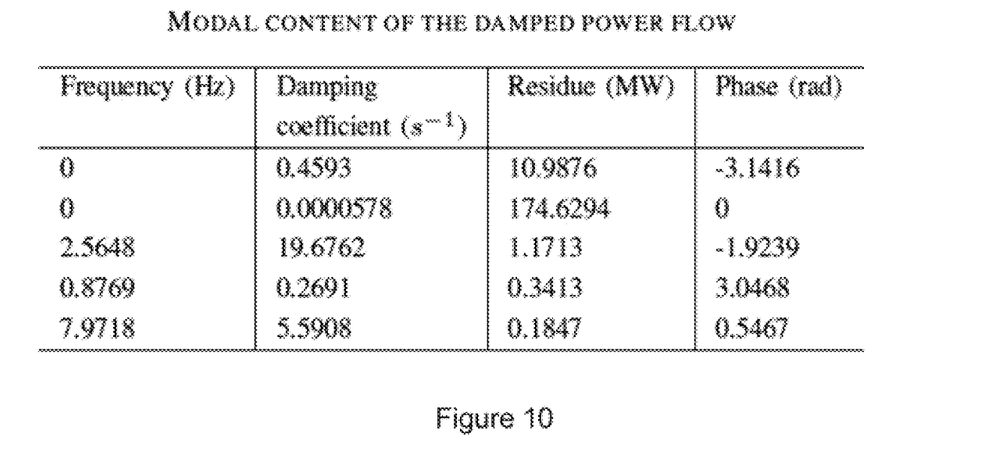
FIG. 10—shows the analyzed result 1000 of the damped oscillations of FIG. 9 showing increased damping and reduction in the residual power in the dominant oscillatory mode as per an embodiment of the invention.

The result is again analyzed using the matrix pencil method as previously to identify the modes of oscillation and the residual power at each mode. The analyzed result 1000 is shown in FIG. 10. The result 1000 indicates that the dominant oscillatory mode of operation has shifted slightly from the $f_{osc}$=0.9424 Hz to $f_{damp}$=0.8769 as the dominant oscillatory mode. The implementation of the inventive idea using a pre-assigned group of distributed FACTS devices that are voltage/impedance injection modules, typically used as distributed power flow control devices, distributed over the power system, with capability for fast cumulative response to detected power oscillations has resulted in a substantial reduction in the residual power at the dominant oscillatory mode and hence is effective in damping of the Power oscillations in the power system.

Figure 11:
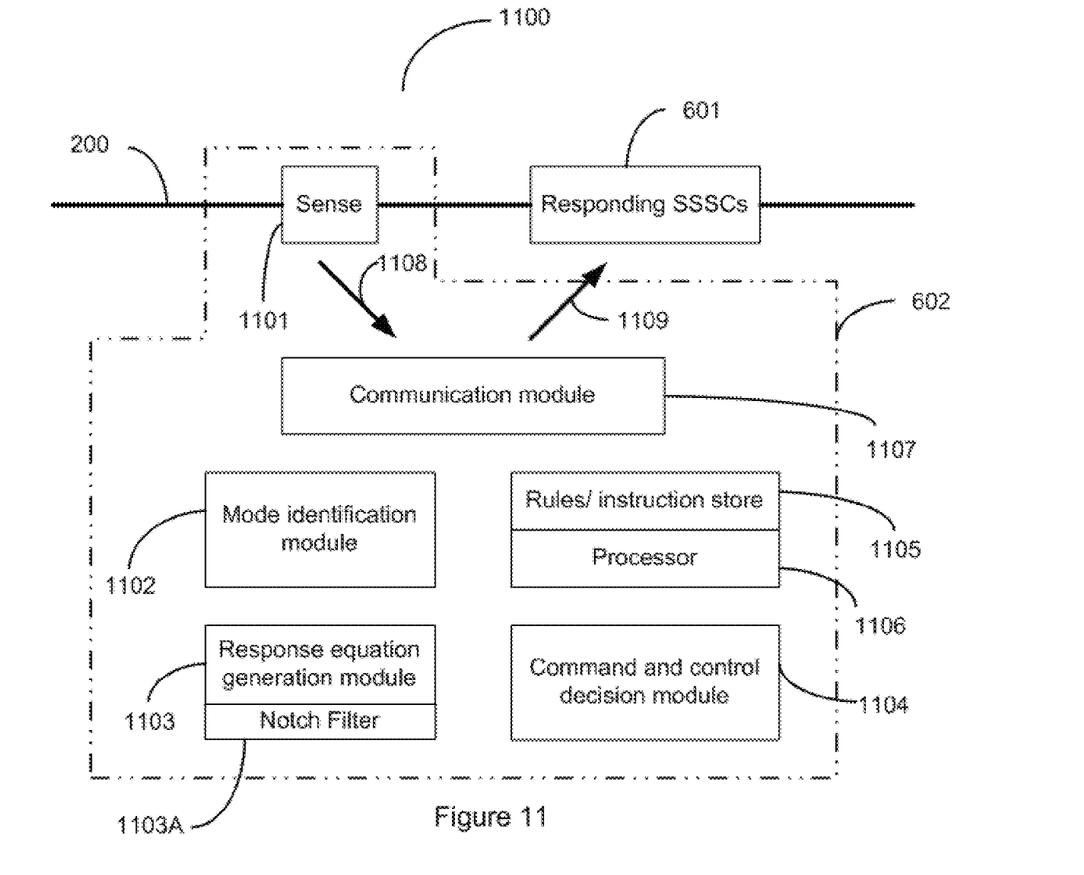
FIG. 11—shows the exemplary block diagram 1100 of the power oscillation damping system as per an embodiment of the current invention.

FIG. 11 shows a typical power oscillation damping (POD) system block diagram 1100. The power oscillation damping system 1100 comprise; a sensor module 1101 that is coupled to the power lines 200 of the power system coupled to the power oscillations damping (POD) controller 602

The sensor module 1101 has a sensor to measure and track a reference signal of the power system including the oscillating mode and hence is enabled to sense power oscillations on the power system 600 when they happen. The sensed information on the power line is sent via a communication channel 1108 associated with a communication module 1107 of the POD system 1100 to a mode identification module 1102. The mode identification module 1102 analyzes the received oscillatory signal from the sensor module 1101 and enable extraction of the dominant oscillatory mode of power oscillation of the power system, initiated by any transient events affecting the power system 600, using any of the methods available. The POD system 1100 further comprises a response equation generation module 1103 that generates a set of damping equations based on the extracted dominant modes of the low frequency power oscillation identified, to damp the power oscillations. The low frequency components are extracted using a notch filter 1103A which is part of the equation generation module 1103. The generated damping equations are sent to a command and control decision module 1104 which is part of the POD system 1100. The command and control decision module 1104 makes decisions on how to distribute the damping instructions to a group of distributed SSSCs 601 on the power system. These decisions are made based on the damping equations and pre-stored rules and instructions, stored in a rules and instruction store 1105, of the POD system 1100. Once the command and control decisions have been made, the decisions are sent to the communication module 1107 to transfer the appropriate instructions to a group of distributed injection modules on the power lines. The communication module 1107 transfers the command and instructions to the appropriate voltage/impedance injection modules assigned to inject the voltage/impedance to damp the power oscillations using the communication channel 1109 linking the responding SSSCs 601 to the POD system 1100. The processing power for the operation of the POD system 1100 is provided by a processor unit 1106 within the POD system 1100.

FIG. 12 is an exemplary flow diagram of the operation of the POD system in FIG. 11.

When a transient event happens on the power system, the system will go into low frequency power oscillations, if the damping at the oscillating frequencies are low. With the addition of generation facilities using renewable resources, the overall inertia and damping of the power systems have gone down and the occurrences of transients have increased. In order to prevent system oscillations, it is necessary to add circuits to prevent power oscillations.

When power oscillations are initiated on the power system by transient events, sensors that form part of a power oscillation damping (POD) system, coupled to the transmission lines of the power system senses the power oscillations on the power lines. S1201.

The sensed information regarding the power oscillations are sent over a communication channel to a communication module of the power oscillation damping (POD) controller. S1202.

The communication module of the POD system receives the sensed and transferred information and sends it to a mode identification module of the POD system. The mode identification module receives the information and identifies the dominant low frequency oscillatory modes of the power oscillation using a processing capability within the POD controller. S1203.

The low frequency oscillation power components of the dominant modes of the power oscillation are extracted from the identified oscillation using a notch filter, that eliminates the non-oscillatory power components. S1204.

A response equation generation module in the POD system uses the power components of the identified dominant oscillatory mode and the exponential modes to generate a set of damping equations to counteract the oscillatory modes. S1205.

The damping equations and a set of pre-established rules saved within the POD system are used by a command and decision module of the POD system to generate commands and instructions to be sent to a plurality of voltage/impedance injection modules distributed over the power lines of the power system. The commands and instructions enable each of the group of pre-selected voltage/impedance injection modules to generate differing values of voltage/impedance, that are within their ratings, which when combined together produce the pseudo-sinusoidal voltage for injection onto the power system for power oscillation damping. S1206.

The generated commands and instructions are transferred to the communication module of the POD system for transmission to the distributed voltage/impedance injection module over a communication channel. S1207.

The distributed voltage/impedance injection modules receive the commands and instructions and generate and inject the appropriate voltage/impedance on to the power lines based on the command and instructions received to damp the power oscillations of the power system. The pre-assigned group of voltage/impedance injection modules act together to cumulatively generate and inject sufficient voltage/impedance to achieve power oscillation damping on the power system. S1208.

Note specifically, that in an exemplary embodiment earlier described, only the most dominant oscillatory mode is damped, as that was clearly the most dominant oscillatory mode with the most power and that was least damped of the power oscillation, though FIG. 12 allows for the damping of more than one mode simultaneously, should a system have more than one oscillatory mode that are large enough and/or have a sufficiently low inherent damping to make simultaneous damping in accordance with the present invention desirable. In particular, the mode identification module S1203 will indicate that more than one mode should be damped, from which additional commands and instructions can be generated. Since the system has been considered to be linear, damping for multiple modes will simply be the sum of the commands of each mode to be damped, and may be actually summed and applied to a transmission line by one or one group of voltage/impedance injection modules, or the damping for each mode may be applied to different voltage/impedance injection modules.

Even though the invention disclosed is described using specific implementations, it is intended only to be exemplary and non-limiting. The practitioners of the art will be able to understand and modify the same based on new innovations and concepts, as they are made available. The invention is intended to encompass these modifications.

What is claimed is:

1. A method for damping oscillations in a high voltage power grid, including power distribution and supply systems, comprising:
    distributing a plurality of flexible alternating current transmission system (FACTS) modules over high voltage transmission lines of the high voltage power grid and attaching the FACTS modules to the high voltage transmission lines of the high voltage power grid, to inject voltages/impedances onto the high voltage power transmission lines of the high voltage power grid, wherein some of the plurality of FACTS modules are connected in series and are pre-assigned for power oscillation damping application to collectively generate and inject the voltages/impedances that are combined to achieve power oscillation damping on the high voltage power transmission lines;
    sensing power oscillations on the high voltage power transmission lines of the high voltage power grid;
    extracting the dominant oscillatory mode or modes of sensed power oscillations on the high voltage transmission lines; and
    injecting, by the distributed plurality of FACTS modules, voltages/impedances responsive to at least a most dominant oscillatory mode onto the respective high voltage transmission lines to counteract the respective oscillations.

2. The method of claim 1 wherein the most dominant oscillatory mode is selected by considering at least in part its damping coefficient before injecting voltages/impedances to counteract the respective oscillation.

3. The method of claim 1 wherein the distributed plurality of FACTS modules comprise distributed static series synchronous compensators that are individually programmed and act as a group for power oscillation damping by controlled voltage/impedance injections.

4. The method of claim 3 wherein and the voltage/impedance injections are not all the same for all static series synchronous compensators to counteract the oscillations on the high voltage power lines.

5. The method of claim 3 wherein the distributed static series synchronous compensators comprise a plurality of distributed transformer less static series synchronous compensators, at least one of which is supported on the high voltage transmission line or by a tower supporting the respective high voltage transmission line.

6. The method of claim 3 wherein some of the plurality of distributed static series synchronous compensators (SSSCs) are pre-assigned into a group for power oscillation damping, that allow each of the pre-assigned distributed SSSCs in the group to provide voltages/impedances, that are according to their ratings, and that when injected on to the power system, cumulatively provide the required power oscillation damping.

7. The method of claim 1 wherein a central damping controller responsive to the sensing of power oscillations on the high voltage transmission lines generates equations for damping sequences of sensed oscillatory modes extracted from the oscillations in the power system, and selects at least one dominant oscillatory mode to provide command and instructions to the distributed impedance/voltage injectors to counteract at least the most dominant oscillatory mode.

8. The method of claim 7 wherein the plurality of FACTS modules are all connected in series and are used to generate the damping signal based on the command and instructions to oppose the oscillations and provide damping of the power oscillations.

9. The method of claim 8 wherein the central damping controller enables some or all of the plurality of FACTS modules to inject the voltages/impedances either proportionally, equally, or based on their ratings.

10. The method of claim 1 wherein the power oscillations are sensed at least one substation and command and instructions are communicated to the plurality of FACTS modules to generate counteracting voltages to damp the oscillations.

11. The method of claim 1, further comprising:
    extracting low-frequency power components of the power oscillations using a notch filter, wherein the injecting the voltages/impedances is further responsive to the extracted low-frequency power components of the power oscillations.

12. A power oscillation damping method comprising:
    sensing power oscillations in a high voltage power system due to a transient event;
    estimating at least a dominant oscillatory mode from the sensed signal using an estimation method;
    generating damping equations based at least on the dominant oscillatory mode;
    generating and sending commands and instructions to a plurality of series connected flexible alternating current transmission system (FACTS) devices, pre-assigned for power oscillation damping and distributed over high voltage power transmission lines of the high voltage power system by injecting voltage/impedance on the high voltage power transmission lines based on the damping equations and the rules established for sharing of injected response between the plurality of series connected FACTS devices; and
    injecting voltage/impedance by the plurality of series connected FACTS devices to damp the power oscillations based on the commands and instructions;
    wherein the injected voltages/impedances by the plurality of series connected FACTS devices are combined to have characteristics of a pseudo-sinusoidal wave form at a frequency of the power oscillations.

13. The method of claim 12, further comprising:
    extracting low-frequency power components of the power oscillations using a notch filter centered at a dominant oscillation frequency, wherein the injecting the voltage/impedance is to damp the low-frequency power components of the power oscillations, based on the extracting using the notch filter.

14. A power oscillation damping system comprising:
    a power oscillation sensing module that has a sensor to measure a reference signal of an AC power system and is enabled to sense power oscillations;
    a mode identification module, that is part of a power oscillation controller with processing power, and determines a dominant oscillatory mode in the power oscillations;
    a voltage/impedance injection response equation determination module that determines injection voltages/impedances to be impressed on high voltage transmission lines of a high voltage power grid in response at least to the dominant oscillatory mode in the power oscillations caused by a transient event;

a command and decision module that receives the response equation and allocates the proportions of the voltage/impedance injection to each of a plurality of pre-assigned flexible alternating current transmission system (FACTS) modules selected to respond to the power oscillations for damping, wherein the pre-assigned FACTS modules are distributed over the high voltage transmission lines; and a communication module for receiving input from the command and decision module and communicating the command and instructions to the plurality of pre-assigned FACTS modules;

wherein the plurality of pre-assigned FACTS modules, with response capability for injecting voltage/impedance, communicably coupled to the communication module, generate and inject voltages/impedances responsive to the voltage/impedance injection response equation, to dampen the power oscillations.

15. The power oscillation damping system of claim 14, wherein:

the mode identification module further extracts low-frequency power components of the power oscillations in the power oscillations using a notch filter; and the voltage/impedance injection response equation determination module determines the injection voltages/impedances to be impressed on the transmission line based, at least in part, on the extracted low-frequency power components of the power oscillations.

* * * * *